(12) United States Patent
Odaohhara (10) Patent No.: US 8,499,181 B2
(45) Date of Patent: Jul. 30, 2013

(54) METHOD FOR CONTROLLING VOLTAGES SUPPLIED TO A PROCESSOR

(75) Inventor: Shigefumi Odaohhara, Yamato (JP)

(73) Assignee: Lenovo (Singapore) Pte Ltd, Singapore (SG)

( * ) Notice: Subject to any disclaimer, the term of this patent is extended or adjusted under 35 U.S.C. 154(b) by 362 days.

(21) Appl. No.: 12/968,386

(22) Filed: Dec. 15, 2010

(65) Prior Publication Data

US 2011/0179298 A1 Jul. 21, 2011

(30) Foreign Application Priority Data

Jan. 17, 2010 (JP) .................. 2010-007616

(51) Int. Cl.
- *G06F 1/00* (2006.01)
- *G06F 1/26* (2006.01)
- *G06F 1/32* (2006.01)

(52) U.S. Cl.
USPC ........... 713/323; 713/300; 713/310; 713/320; 713/322

(58) Field of Classification Search
USPC .......................... 713/300, 310, 320, 322, 323
See application file for complete search history.

(56) References Cited

U.S. PATENT DOCUMENTS

| | | | | |
|---|---|---|---|---|
| 7,167,992 B2 * | 1/2007 | Katoh et al. | ............ | 713/320 |
| 7,181,634 B2 * | 2/2007 | Katoh et al. | ............ | 713/320 |
| 7,464,278 B2 * | 12/2008 | Cohen et al. | ............ | 713/320 |
| 8,112,645 B2 * | 2/2012 | Rozen et al. | ............ | 713/320 |
| 2008/0141047 A1 * | 6/2008 | Riviere-Cazaux | ........ | 713/300 |
| 2009/0039844 A1 * | 2/2009 | Hoshino et al. | ........ | 323/273 |
| 2009/0177903 A1 * | 7/2009 | Rozen et al. | ............ | 713/322 |
| 2010/0295521 A1 * | 11/2010 | Odaohhara | ............ | 323/282 |

* cited by examiner

*Primary Examiner* — Paul Yanchus, III
*Assistant Examiner* — Zahid Choudhury
(74) *Attorney, Agent, or Firm* — Antony P. Ng; Yudell Isidore Ng Russell PLLC (57) ABSTRACT

A for supplying power to a processor is disclosed. The power supply unit includes a smoothing capacitor, a controller, and an arithmetic circuit. The controller controls an output voltage according to each power state of a processor operating in a transition state where a power state of the processor transitions between an active state and a predetermined sleeping state at a predetermined transition frequency. The arithmetic circuit determines a transition stop condition based on power consumption of the processor and charging loss generated at the smoothing capacitor during the transition of the active state, and outputs a transition stop signal to stop transition to the predetermined sleeping state.

11 Claims, 5 Drawing Sheets

| APPLICATIONS | TRANSITION FREQUENCY (Hz) |
|---|---|
| 3D Graphics Program | 5K |
| Media Player | 1K |
| Desktop Idle | 139 |
| Messenger | 121 |
| Acrobat Reader | 113 |
| PowerPoint | 95 |
| Excel | 79 |
| Word | 71 |
| Screen Saber | 65 |
| Key input | 10 |
| IE | 1 OR LESS |

FIG. 5

FIG. 6

METHOD FOR CONTROLLING VOLTAGES SUPPLIED TO A PROCESSOR

PRIORITY CLAIM

The present application claims benefit of priority under 35 U.S.C. §§120, 365 to the previously filed Japanese Patent Application No. JP2010-007616 entitled, "Method for controlling processor voltage" with a priority date of Jan. 17, 2010, which is incorporated by reference herein.

BACKGROUND

1. Technical Field

The present invention relates to computer systems in general, and in particular to a method for controlling voltages supplied to a processor by a power supply unit. More particularly, the present invention relates to a method for controlling voltages supplied to a processor transitioning between an active state and a sleeping state so as to reduce power consumption.

2. Description of Related Art

The Advanced Configuration and Power Interface (ACPI) specifies several global states, such as G0 state to G2 state, as operating states for a computer system. G0 state is defined as a working state during which a code in a user mode is executed. G1 state is defined as a sleeping state during which a computer operates with less power consumption than that during G0 state. In G1 state, a code in a user mode is not executed, and a computer appears to have stopped its operation to a user. G2 state is defined as a soft-off state during which a computer operates with minimum power consumption, and codes in a user mode and in a system mode are not executed.

The ACPI further specifies an active state and a sleeping state as power states of a system processor in G0 state. The active state, which is defined as C0 state, is a power state during which a processor can execute instructions. The sleeping state, which is defined as any one of C1 state to Cn state, is a power state during which a processor does not execute instructions, and a core voltage and power consumption are less than those during C0 state. The time required to return to C0 state from each one of C1 state to Cn state increases as the power consumption in the state decreases.

There is a conventional method for changing a switching mode of power states for a processor in order to avoid noise generated from a capacitor provided in a DC/DC converter supplying electric power to the processor. Under this method, when a processor cyclically transitions between C4 state and C0 state and if a switching cycle of the power states is shorter than a set cycle, an operating mode of the processor is changed between C3 state and C0 state.

Certain Intel processors can transition up to C6 state. When a processor frequently transitions between C0 state and C6 state, average power consumption will increase because a processor state is to be saved and returned to/from a static memory. Thus, an "Auto-Demote" function is implemented in order to saving power. Under the Auto-Demote function, if a processor transitions to C6 state with frequency of 3 to 4 milliseconds or less, C4 state is kept without transitioning to C6 state.

When an ACPI-compliant operating system (OS) determines that instructions to be processed do not exist and makes a processor execute a HALT instruction, the processor transitions to C1 state. When the OS further determines that instructions to be processed by the processor do not exist even after the transition to C1 state, the OS increases the depth of a sleeping state as in the order of C2 state, C3 state and C4 state. When the processor shifts to a sleeping state, an application program requests the OS to regularly resume the operation of the processor in C0 state regardless of whether there is a thread to be processed or not. The frequency for regularly resuming varies from one application to another.

In order for a processor to receive a voltage suitable for each sleeping state from a DC/DC converter, the processor sends voltage identification data to the DC/DC converter. The DC/DC converter decreases an output voltage with increase in the depth of sleeping states of the processor. Accordingly, when the processor transitions between C0 state and Cn state with a predetermined cycle according to the OS and the application program, the DC/DC converter changes the output voltage in synchronization with the transition of power states and in accordance with the voltage identification data.

At this time, the highest voltage is applied to the processor in C0 state, and a lower voltage is applied cyclically thereto in a sleeping state. An output circuit of the DC/DC converter is connected with a smoothing capacitor in order to decrease ripple of the voltage. When the output voltage is switched from high to low, electric charge accumulated in the smoothing capacitor is discharged, whereas when the output voltage is switched from low to high, electric charge discharged has to be charged, thus generating charging loss. Charging loss generated at the smoothing capacitor due to the switching of the output voltage increases in proportion to the switching cycle of power states.

Since the power consumption of a processor is lower in a sleeping state than in C0 state, power consumption of the processor becomes less in the processor transitioning between C0 state and Cn state than in the processor maintained in C0 state. On the other hand, as the switching cycle is shortened, the charging loss of the capacitor increases. Thus, in order to reduce power consumption of a computer, comprehensive determination has to be made with consideration given to the power consumption of the processor and the charging loss of the smoothing capacitor.

Consequently, it would be desirable to provide a method for controlling voltages supplied to a processor transitioning between an active state and a sleeping state in order to reduce power consumption.

SUMMARY

In accordance with a preferred embodiment of the present invention, a power supply unit includes a smoothing capacitor, a controller, and an arithmetic circuit. The controller controls an output voltage according to each power state of a processor operating in a transition state where a power state of the processor transitions between an active state and a predetermined sleeping state at a predetermined transition frequency. The arithmetic circuit determines a transition stop condition based on power consumption of the processor and charging loss generated at the smoothing capacitor during the transition of the active state, and outputs a transition stop signal to stop transition to the predetermined sleeping state.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. Power States of a Processor

A processor described in the present embodiment (such as a processor 10 from FIG. 2) can operate in any power state among C0 state, C1 state, C2 state, C3 state, C4 state and C6 state specified by the ACPI. C0 state is defined as an active state during which a processor operates with an operating voltage larger than in any sleeping state and can execute instructions. Transition from C0 state to C1 state takes place when an operating system (OS) executes a HALT instruction.

When the OS executes a HALT instruction, the processor transitions to C1 state, where an idle process that does not execute an actual instruction is scheduled. The processor operating in C1 state can instantaneously transition to C0 state and execute an instruction when a process to be executed is generated or an interrupt occurs. Transition from C0 state to a sleeping state deeper than C1 state takes place when hardware such as a chipset for input/output control (ICH) sends a signal to a pin of the processor allocated to each power state. In the present disclosure, a specific sleeping state is refereed to as Cn state.

In C2 state, a core clock is stopped. In C3 state, the content of L1 cache is flushed into L2 cache, and L1 cache is powered off and a clock generator is stopped. In C4 state, the content of L2 cache is flushed into a main memory one by one, and cache array is powered off in the units of flushed lines. When all lines are flushed, L2 cache is powered off. In C6 state, L1 cache and L2 cache are powered off and the operating state of the processor is saved in a dedicated SRAM.

As a processor capable of operating in multiple sleeping states transitions deeply from C1 state to C6 state, the processor can reduce its power consumption by reducing a core voltage in order to reduce a leak current, stopping a clock, or turning OFF the power of a cache. In one example of an Intel processor, the voltage supplied to the processor in C0 state is 1 V, whereas the voltage in C6 state is 0.35 V. A wakeup time when the processor transitions from Cn state at a certain depth to C0 state is shorter than a wakeup time when the processor transitions from another Cn state deeper than the above.

The states of the processor or the state of the clock generator in each power state described so far are just an example, and it is understood by those skilled in the art that the present invention can use a processor operating in other power states. The processor can be a single core or a double core as long as it enables transition of power states according to the load. In addition, a change in power states of the processor should change the voltage supplied to the processor and its power consumption.

B. Charging Loss

Figure 1A:
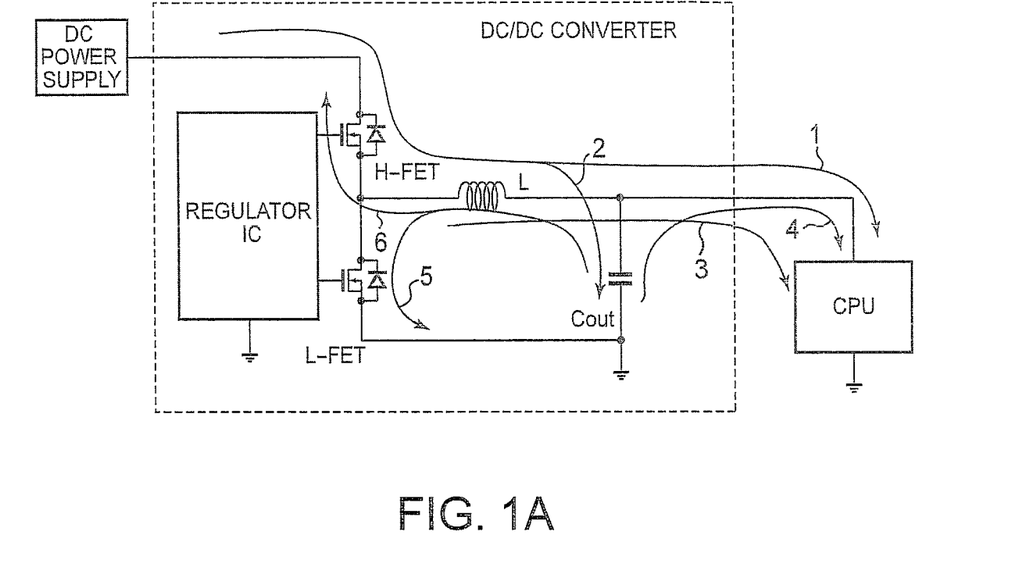
FIGS. 1A and 1B illustrate the principle of generating charging loss at a DC/DC converter.
Figure 1B:
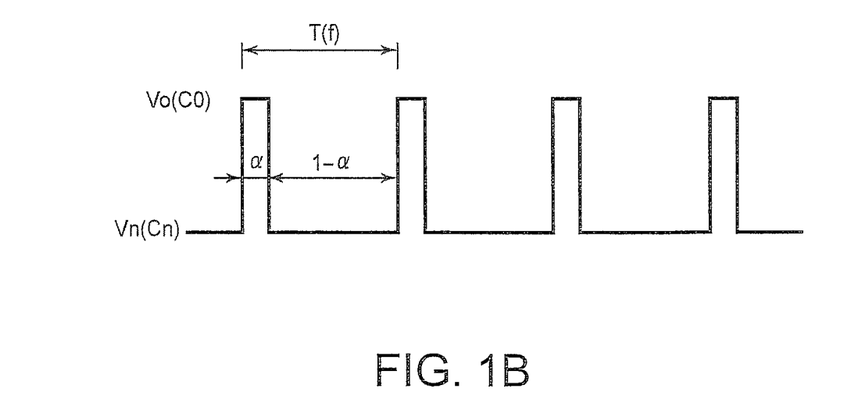

FIGS. 1A and 1B describe the principle of generating charging loss at a DC/DC converter. A DC/DC converter converts DC voltage supplied from a DC power supply to a constant DC voltage suitable for each power state and supplies the same to a processor. As illustrated in FIG. 1B, the processor transitions between C0 state and Cn state with cycle T depending on an application being executed. Voltage Vo applied to the processor in C0 state is the highest among the power states. Voltage Vn applied to the processor in Cn state is smaller than Vo.

In FIG. 1A, the DC/DC converter is made up of a high-side transistor H-FET, a low-side transistor L-FET, an inductor L, a smoothing capacitor Cout and a regulator IC. The inductor L and the smoothing capacitor Cout constitute a smoothing circuit that reduces ripple of voltage and current flowing from the DC/DC converter to the processor. The DC/DC converter uses a synchronous rectification system, and the regulator IC drives the H-FET and the L-FET in a Pulse Width Modulation (PWM) manner so that the H-FET and the L-FET are turned ON alternately with a predetermined cycle. The regulator IC turns the L-FET OFF during ON-duration when the H-FET is ON, and turns the L-FET ON during OFF-duration when the H-FET is OFF.

The regulator IC regulates the ON-duration based on an output voltage detected by a voltage detection circuit (not illustrated), and performs PWM control so that the output voltage is maintained at a constant value set by another device. In the DC/DC converter operating with the constant output voltage, current flows through the processor from the DC power supply along path 1, while charging the smoothing capacitor Cout along path 2. During the OFF-duration, electromagnetic energy accumulated in the inductor L flows through the processor as current along path 3, while current flows through the processor along path 4 from the smoothing capacitor Cout as well. When operation is performed so as to keep the output voltage constant, loss does not occur in charging electric power because the electric power charging the smoothing capacitor C during the ON-duration is supplied to the processor during the OFF-duration if the resistance of the smoothing capacitor C is ignored.

The following considers loss in charging electric power generated at the smoothing capacitor C when the output voltage from the DC/DC converter changes between Vo and Vn in synchronization with the transition of power states of the processor. During operation with the output voltage of Vo, the average voltage of the smoothing capacitor Cout is Vo. When the regulator IC controls the operations of the H-FET and the L-FET so that the ON-duration is shortened and the OFF-duration is lengthened to yield the output voltage of Vn, the output voltage decreases to Vn, and therefore current flows from the smoothing capacitor Cout along path 5 and path 6. The current flowing along path 6 returns to the DC power supply, whereas the current flowing along path 5 flows through a circulating circuit including the smoothing capacitor Cout and the inductor L, during which electric power is consumed.

When the output voltage reaches Vn, the average voltage of the smoothing capacitor Cout also becomes Vn. Thereafter, when the output voltage changes from Vn to Vo, charging electric power is supplied to the smoothing capacitor along path 2 to increase the average voltage of the smoothing capacitor Cout from Vn to Vo. This charging electric power corresponds to the electric power consumed in path 5, and therefore loss in charging electric power (hereinafter called charging loss) occurs due to the change in output voltage. An application requires the processor to transition to C0 state with a cycle unique to and owned by each application when the processor transitions to Cn state.

The power consumption of the processor is smaller in operation in Cn state than in operation in C0 state. However, when the processor transitions cyclically between C0 state and Cn state, the charging loss increases with increase in frequency for transition (hereinafter called transition frequency). Comprehensive determination has to be made as to whether or not to keep the processor in C0 state or to allow the processor to transition to Cn state and to transition between C0 state and Cn state at a predetermined transition frequency as required by the application with consideration given to the power consumption of the processor and the charging loss at the DC/DC converter. For the purpose of distinguishing the transition state of the processor between C0 state and Cn state from the state maintaining Cn state, the transition state between C0 state and Cn state is called Cn transition state.

C. Decision Method of Transitions State

Vo denotes the output voltage of the DC/DC converter during operation in C0 state, and Lo denotes the switching loss and Io denotes current through the processor in such a state. Vn denotes the output voltage of the DC/DC converter during operation in Cn state, and Ln denotes the switching loss and In denotes the current through the processor in such a state. In addition, f denotes the transition frequency, and C denotes the capacitance of the smoothing capacitor Cout. The electric power Po consumed by the processor continuously operating in C0 state is represented by:

$$Po = Vo \times Io$$

The electric power Pn consumed by the processor operating in Cn transition state is represented by:

$$Pn = Vo \times Io \times \alpha + Vn \times In \times (1-\alpha)$$

where $\alpha$ denotes the ratio of the operation in C0 state in one cycle, as illustrated in FIG. 1B.

When the processor operates in Cn transition state at the transition frequency of f, the charging loss Pc generated at the smoothing capacitor Cout is represented by:

$$Pc = 0.5 \times C \times (Vo^2 - Vn^2) \times \beta \times f$$

where $\beta$ denotes a circuit constant with consideration given to the efficiency of the DC/DC converter and the ratio of the electric power collectable in path 6.

When a comparison is made between the total of the power consumption Po of the processor and the power loss Lo generated at the DC power supply unit when the processor operates while maintaining C0 state and the total of the power consumption Pn of the processor, the power loss Ln generated at the DC power supply unit and the charging loss Pc when the processor operates in Cn transition state, a transition stop condition indicating that C0 state is advantageously maintained is represented by:

$$Po + Lo < Pn + Ln + Pc$$

This expression can be transformed to:

$$Po - Pn < Ln - Lo + Pc$$

Since Ln−Lo representing a difference between the power loss at the DC/DC converter operating in Cn transition state and the power loss at the DC/DC converter maintaining C0 state is so small that can be ignored as a whole, the transition stop condition as a result is represented as:

$$Vo \times Io - (Vo \times Io \times \alpha + Vn \times In \times (1-\alpha)) < Pc$$

Since $\alpha \ll 1$, the transition stop condition can be represented by:

$$Vo \times Io - Vn \times In < Pc \qquad (1)$$

Expression (1) can be calculated when Vo, Io, Vn, In, C, f and $\beta$ are available. According to Expression (1), the transition stop condition is satisfied when a difference between the power consumption of the processor maintaining C0 state and the power consumption of the processor operating in Cn transition state is smaller than the charging loss. It can be said that the transition stop condition is satisfied also when the power consumption of the processor maintaining C0 state is smaller than the total of the power consumption of the processor operating in Cn transition state and the charging loss in such a state.

D. Electric Power Control System for Processor

Figure 2:
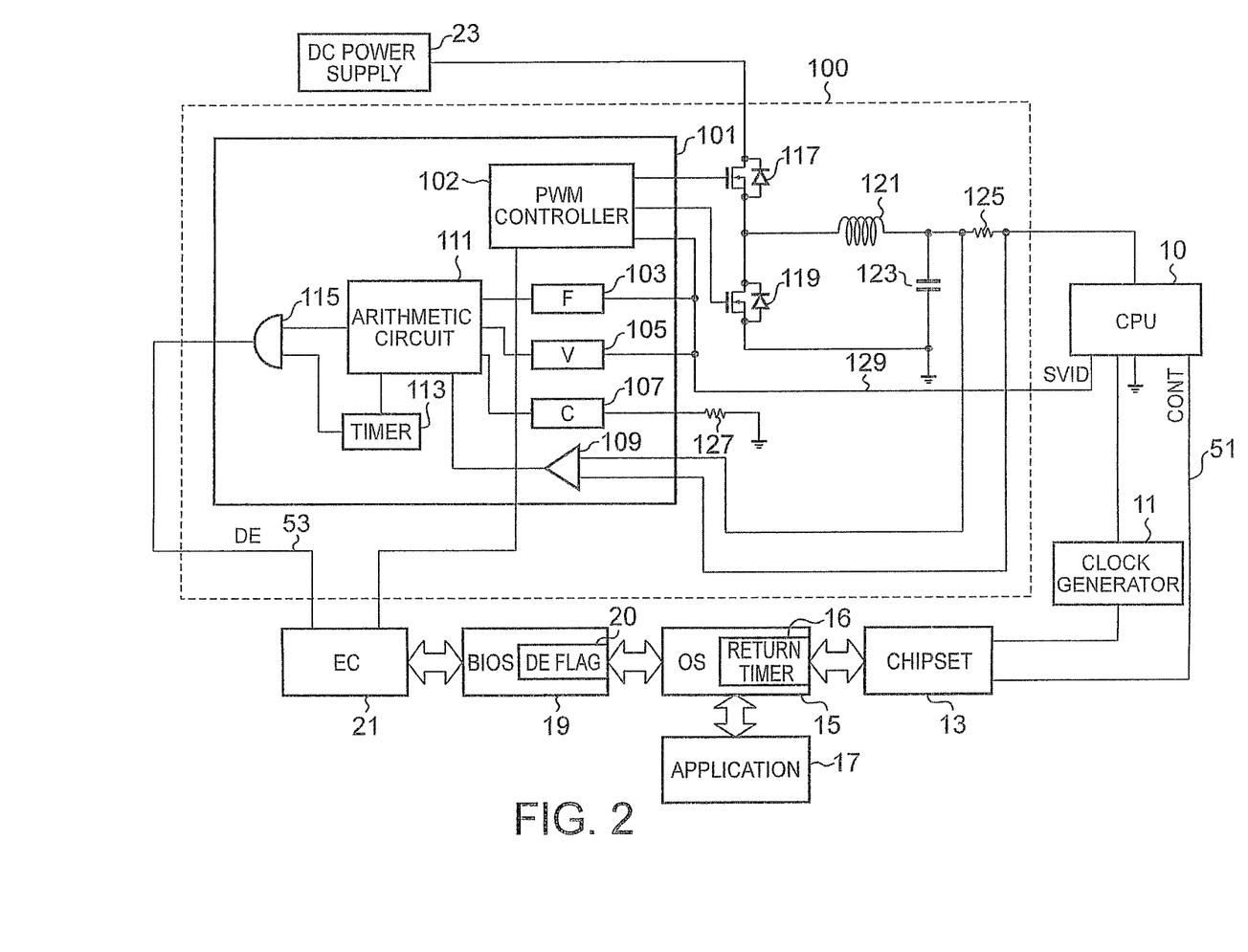
FIG. 2 is a block diagram of an electric power control system that supplies electric power to a processor.

FIG. 2 is a block diagram of an electric power control system that supplies electric power to the processor. The electric power control system can be mounted in a computer system such as a desktop computer, a portable type computer, a server or a PDA. A DC power supply 23 may be an AC adaptor, an upstream DC/DC converter or a battery, from which DC voltage is supplied to a DC/DC converter 100. The DC/DC converter 100 supplies, to the processor 10, a DC voltage suitable for the power state of the processor 10.

The processor 10 includes a voltage identification pin (VID) and sends, to the DC/DC converter 100, identification data indicating an operating voltage and a transition frequency requested in the current power state through line 129. For instance, when the processor 10 transitions between C6 state and C0 state at the transition frequency of 100 Hz, the processor 10 sends, to the DC/DC converter 100, identification data indicating that the voltage in C0 state is 1 V, the voltage in C6 state is 0.35 V, and the transition frequency is 100 Hz.

The processor 10 is provided with multiple control pins (CONT) to transition to a power state of C2 state or deeper. Each control pin is connected with a chipset 13 via a control line 51. When the processor operates in C0 state, the processor can reduce power consumption by a technique called SpeedStep® of Intel Corporation, by which the operating voltage and the operating frequency as one set can be decreased according to the utilization, PowerNow of AMD Inc, or a technique called throttling. The chipset 13 sends a signal to the control line 51, thereby changing a power state of the processor 10. The processor 10 is connected with a clock generator 11, and the clock generator 11 is connected with the chipset 13. The clock generator 11 supplies a clock to the processor 10, a not-illustrated bus, a chipset for memory controller (MCH), a main memory and the like.

The chipset 13 may be a chipset for input/output control (ICH) or other devices. An OS 15 configures an internal register of the chipset 13, thus controlling the operation of the clock generator 11 and the power states of the processor 10. The OS 15 determines the magnitude of load on the processor based on the utilization of the processor 10 and the status of time slice, for example, and writes data to change the current power state to the register of the chipset 13. The OS 15 is provided with a return timer 16 that, when an instruction is issued to transition to a power state of C2 state or deeper, sets time duration or a frequency to regularly return to C0 state and confirm whether or not an instruction to be executed exists or an interruption occurs.

Figure 5:
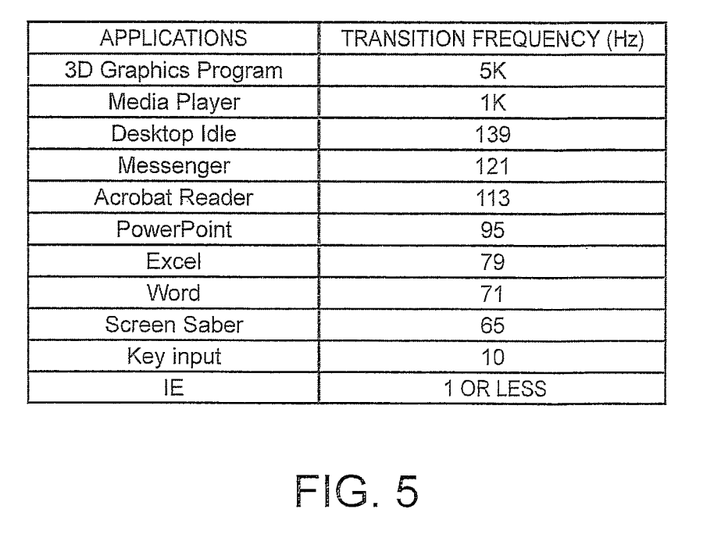
FIG. 5 lists transition frequencies requested by various application programs.

For example, when the OS 15 sets the return timer at a predetermined time duration and makes the processor 10 transition to C6 state based on the current load status, the processor 10 returns to C0 state after operation in C6 state for the predetermined time duration, operates in C0 state for a short time and then returns to C6 state. Then, the processor 10 returns to C0 state after the predetermined time duration and repeats these operations. The OS 15 and an application 17 are programs as the load on the processor 10. The computer system implements application 17, where when each application operates, the application sets its return time at the return timer 16. That is, the transition frequency in the computer system is decided by the application executed. FIG. 5 illustrates a list of transition frequencies requested by various application programs.

A BIOS 19 is compliant with the ACPI and is stored in a flash ROM. In the BIOS 19, effective sleeping states supported by the processor 10 are configured by the system or a user. The BIOS 19 includes a DE flag 20 to stop the processor 10 from transitioning to the current Cn state when the BIOS 19 is loaded into the main memory. The OS 15 observes the load status of the processor, and determines a transition state for operation based on the effective sleeping states set in the BIOS 19 and the DE flag 20.

An embedded controller (EC) 21 is a microcomputer that manages the power supply and a temperature of the computer, for example, and the EC 21 is connected with a PWM controller 102. The EC 21 controls the operation of the PWM controller 102. The EC 21 further is connected with an AND gate 115 of the DC/DC converter 100 via line 53. When receiving a disable (DE) signal to stop the transition to Cn state from the AND gate 115, the EC 21 sets the DE flag 20.

For example, when the EC 21 sets the DE flag 20 while the processor 10 operates in C6 transition state, the OS 15 configures the register of the chipset 13 so as to stop the processor 10 from transitioning to C6 state and maintain the processor 10 at C0 state. Then, when the setting of the DE flag 20 is cancelled, the OS 15 configures the register of the chipset 13 so that the processor 10 operates in C6 transition state.

Alternatively, when the DE flag 20 is set, the OS 15 or other programs may configure the register of the chipset 13 so that the processor 10 transitions between C0 state and a sleeping state shallower than the current sleeping state by one step. For example, when the DE flag 20 is set while the processor 10 operates in C6 transition state, the OS 15 makes the processor 10 operate in C4 transition state. When the DE flag 20 is further set, the OS 15 may make the processor 10 operate in C3 transition state. When the setting of the DE flag 20 is cancelled, the OS 15 may make the processor 10 operate in C6 transition state. A program different from the OS 15 may execute changing of the return timer 16 and the transition state.

The DC/DC converter 100 includes: a high-side FET 117 and a low-side FET 119 that are MOS transistors; an inductor 121; and a smoothing capacitor 123. These elements operate similarly to the elements described in FIG. 1, and the smoothing capacitor 123 generates charging loss when the output voltage changes with the transition frequency. A regulator IC 101 includes: the PWM controller 102; a transition frequency input circuit 103; an operating voltage input circuit 105; a capacitance input circuit 107; an operating amplifier 109; an arithmetic circuit 111; a timer 113; and the AND gate 115. A drain of the high-side FET 117 is connected with the DC power supply 23, and a source thereof is connected with a drain of the low-side FET 119. A source of the low-side FET 119 is connected to ground.

Gates of the high-side FET 117 and the low-side FET 119 are connected to the PWM controller 102. One terminal of the inductor 121 is connected with the source of the high-side FET 117 and the drain of the low-side FET 119, and the other terminal is connected with one terminal of a sense resistor 125 and one terminal of the smoothing capacitor 123. The other terminal of the sense resistor 125 is connected with the processor 10. The other terminal of the smoothing capacitor 123 is connected to ground. Both ends of the sense resistor 125 are connected with input terminals of the operating amplifier 109. The output from the operating amplifier 109 is connected with the arithmetic circuit 111, and the operating amplifier 109 amplifies voltage across the sense resistor 125 corresponding to the output current Io of the DC/DC converter 100 and outputs the same to the arithmetic circuit 111.

Input terminals of the transition frequency input circuit 103 and the operating voltage input circuit 105 are connected with line 129, and output terminals thereof are connected with the arithmetic circuit 111. The transition frequency input circuit 103 includes a frequency counter that counts a change in operating voltage indicated by identification data received from the processor 10, and sends a result thereof to the arithmetic circuit 111 as the transition frequency f that is an analog signal. Alternatively, the transition frequency input circuit 103 may convert the identification data indicating the transition frequency f received from the processor 10 into an analog signal and send the same to the arithmetic circuit 111. The operating voltage input circuit 105 converts the identification data relating to the operating voltage received from the processor and sends the same to the arithmetic circuit. The PWM controller 102 is connected with the processor 10 via line 129, and switching-controls the high-side FET 117 and the low-side FET 119 in a synchronous rectification method so that the voltage set based on the identification data received from the processor 10 can be output at the transition frequency in synchronization with the power state of the processor 10. To the PWM controller 102, an output voltage from a not-illustrated voltage-dividing resistor is fed-back so as to allow a constant voltage to be output.

An input terminal of the capacitance input circuit 107 is connected with one terminal of an identification resistor 127, and an output terminal thereof is connected with the arithmetic circuit 111. The identification resistor 127 has a resistance value corresponding to the capacitance of the smoothing capacitor 123, and the other terminal of the identification resistor 127 is connected to ground. The capacitance input circuit 107 converts the resistance value of the identification resistor 127 into an analog signal, and sends the same to the arithmetic circuit 111. The output of the arithmetic circuit 111 is connected with one terminal of the AND gate 115. The timer 113 is connected with the other terminal of the AND gate 115.

The arithmetic circuit 111 includes hardware to calculate the transition stop condition of Expression (1) by a wired logic method, and is made up of an operational amplifier and a logic element. The arithmetic circuit 111 may be configured with a microprocessor. The arithmetic circuit 111 includes a value of the circuit constant β incorporated therein so as to calculate the transition stop condition, and the capacitance of the smoothing capacitor 123 can be obtained through the resistor 127. The arithmetic circuit 111 obtains the output voltages Vo, Vn and the transition frequency f from the processor 10 through the operating voltage input circuit 105 and the transition frequency input circuit 103 connected with line 129, and can obtain the output currents Io, In from the operating amplifier 109 connected with the sense resistor 125, and therefore the arithmetic circuit 111 can calculate the transition stop condition dynamically when the processor 10 operates in Cn transition state.

The arithmetic circuit 111 calculates the transition stop condition only when the processor 10 operates in Cn transition state, and does not calculate the transition stop condition when the processor 10 maintains C0 state. When it is determined that the transition stop condition is satisfied, the arithmetic circuit 111 outputs a transition stop signal to one of the input terminals of the AND gate 115. The timer 113 is connected with the arithmetic circuit 111 and the other input terminal of the AND gate 115. The timer 113 outputs a timer signal in a constant cycle with a constant ON-duration turning ON and a constant OFF-duration turning OFF. For example, the ON-duration may be 1000 milliseconds, and the OFF-duration may be 10 milliseconds. When the arithmetic circuit 111 outputs the transition stop signal and when the timer signal turns ON, then the DE signal turns ON. When the timer signal turns OFF, in response, the arithmetic circuit 111 is reset so that the transition stop signal output turns OFF. When the timer signal turns OFF, the DE signal also turns OFF.

E. Control Method of Power States

Figure 3:
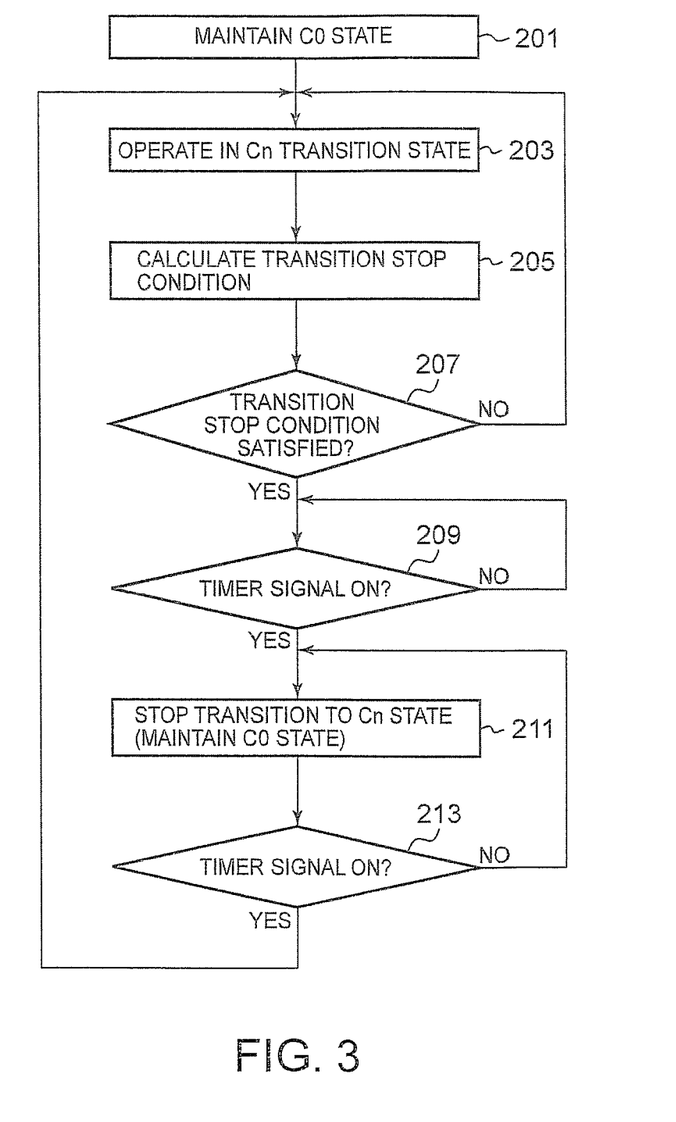
FIG. 3 is a flowchart of a method for controlling power states of a processor.
Figure 4:
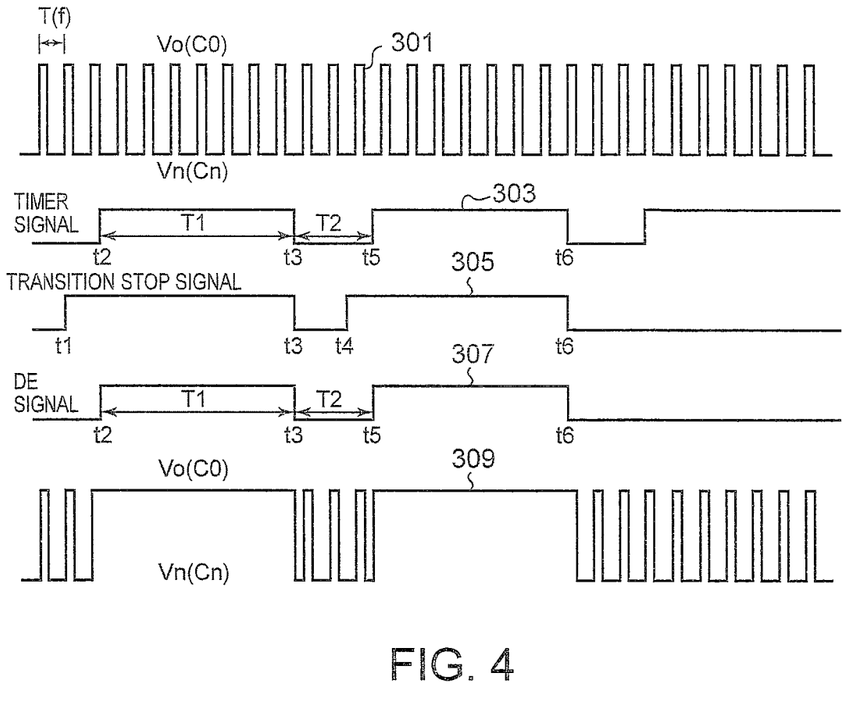
FIG. 4 illustrates waveforms of output voltages from a DC/DC converter.

The following describes a method for supplying electric power by the electric power control system from FIG. 2. FIG. 3 is a flowchart illustrating the method for controlling the power states of the processor 10, and FIG. 4 illustrates waveforms of the output voltage from the DC/DC converter 100. In FIG. 4, line 301 illustrates an output voltage of the DC/DC converter 100 when the power state control according to the present embodiment is not performed, and the processor 10 operates continuously in Cn transition state at a depth of a sleeping state decided by an algorithm of the OS 15 to make the processor 10 transition to the sleeping state and at the transition frequency f decided by the return time T set by the application 17.

Line 303 illustrates a timer signal output from the timer 113, line 305 illustrates a transition stop signal output from the arithmetic circuit 111, and line 307 illustrates a DE signal output from the AND gate 115. Line 309 illustrates an output voltage of the DC/DC converter 100 when power state control according to the present embodiment is performed with respect to line 301. The timer 113 outputs a timer signal in a constant cycle including ON-duration T1 and OFF-duration T2 independently and regardless of the transition frequency and the transition stop signal.

At block 201, the processor 10 operates in C0 state while receiving electric power from the DC/DC converter 100. The OS 15 may change the operating voltage and the operating frequency as one set for the processor 10 operating in C0 state based on a predetermined algorithm in accordance with the load status. The return timer 16 has a predetermined return time T set therein depending on an application 17 currently executed by the processor 10. Then the OS 15 refers to the effective power states and the DE flag 20 set in the BIOS 19, and when the DE flag 20 is not set, the OS 15 makes the processor 10 transition to a deeper sleeping state one by one from C1 state in accordance with the load status on the processor 10. At block 203, the OS 15 makes the processor 10 operate in Cn transition state. When the OS 15 writes data for transition to Cn state and data indicating a return time T to the register of the chipset 13, the processor 10 operates in Cn transition state so as to transition between Cn state and C0 state at the transition frequency f decided by the return time T.

The processor 10 sends identification data to the PWM controller 102 via line 129 so that the voltage Vn is output during Cn state and the voltage Vo is output during C0 state. The transition frequency input circuit 103 calculates a transition frequency f based on a change in operating voltage indicated by the identification data received from the processor 10, and sends the same to the arithmetic circuit 111. The DC/DC converter 100 varies the output voltage between Vn and Vo at the transition frequency f in synchronization with the transition of power states of the processor 10. This state is illustrated by line 301 before time t2 in FIG. 4. A cyclic change in voltage of the DC/DC converter 100 causes charging loss generated at the smoothing capacitor 123.

When the processor operates in Cn transition state, the arithmetic circuit 111 calculates a transition stop condition. At block 205, the arithmetic circuit 111 obtains the output voltage Vo corresponding to C0 state and the output voltage Vn corresponding to Cn state from the operating voltage input circuit 105, obtains the transition frequency f from the transition frequency input circuit 103, and further obtains the capacitance of the smoothing capacitor 123 from the identification resistor 127 so as to calculate the transition stop condition. When the arithmetic circuit 111 determines that the transition stop condition is satisfied at time t1, at block 207 the arithmetic circuit 111 outputs a transition stop signal, and the procedure proceeds to block 209. Unless the transition stop condition is satisfied at block 207, the processor 10 returns to block 203 and operates in Cn transition state.

At block 209, when both of the timer signal and the transition stop signal turn ON at time t2, the AND gate 115 outputs a DE signal to the EC 21. The EC 21 receiving the DE signal sets a DE flag 20 of the BIOS 19. When receiving notification from the BIOS 19 that the DE flag 20 is set, the OS 15 recognizes that the current sleeping state is set disabled and configures the register of the chipset 13 so that the processor 10 maintains C0 state. As illustrated in line 309, the DE signal is ON during ON-duration T1 of the time signal as long as the transition stop signal is ON, so that the output voltage Vo from the DC/DC converter 100 is kept at Vo (block 211). Therefore, charging loss does not occur at the smoothing capacitor, and the power loss obtained by summing the charging loss and the power consumption of the processor 10 becomes smaller than in the case where the processor operates in Cn transition state. At block 213, as long as the transition stop signal does not turn OFF, the processor 10 maintains C0 state until ON-duration T1 elapses.

At block 213, when ON-duration T1 of the timer signal elapses at time t3, the timer signal turns OFF. In response, the arithmetic circuit 111 stops the output of the transition stop signal so that the DE signal turns OFF. When recognizing that the DE signal turns OFF, the EC 21 cancels the setting of the DE flag 20, and then the OS 15 returns to block 203 and makes the processor 10 operate in Cn transition state during OFF-duration T2 from time t3 to time t5 in a similar procedure mentioned above. The OFF-duration T2 is time duration allowing the arithmetic circuit 111 to recalculate as to whether both of and any one of the output current and the transition frequency of the DC/DC converter 100 has changed or not during the operation of the processor 10 maintaining C0 state so as to change the transition stop condition not to be satisfied.

At block 205, when the arithmetic circuit 111 recognizes that the processor 10 operates in Cn transition state, the arithmetic circuit 111 calculates the transition stop condition again at block 207. The arithmetic circuit 111 then determines that the transition stop condition is satisfied at time t4, and outputs a transition stop signal. During OFF-duration T2, the AND gate 115 does not output a DE signal because the timer signal is OFF. The processor 10 operates in Cn transition state before time t5. At block 209, when the OFF-duration T2 of the timer signal elapses, the procedure proceeds to block 211 at time t5. At block 211, when the DE signal turns ON, transition to Cn state is stopped, and the processor maintains C0 state again.

At block 213, when ON-duration T1 is finished, the timer signal turns OFF at time t6, and the transition stop signal and the DE signal turn OFF, then the processor 10 operates in Cn transition state (block 203). At block 205, when the arithmetic circuit 111 starts calculating of the transition stop condition, then it is determined that the transition stop condition is not satisfied this time. Then, after time t6, the procedure returns from block 207 to block 203, and the arithmetic circuit 111 does not output the transition stop signal. As a result, after time t6, the processor 10 operates in Cn transition state. In one example, when the processor operates in C6 transition state, the transition stop condition is satisfied when the transition frequency exceeds 1 KHz. Thus, when an application that sets a return time T exceeding 1 KHz is executed, the arithmetic circuit 111 may determine that the processor 10 maintains C0 state for operation so as to reduce power consumption.

F. Another Control Method of Power States

Figure 6:
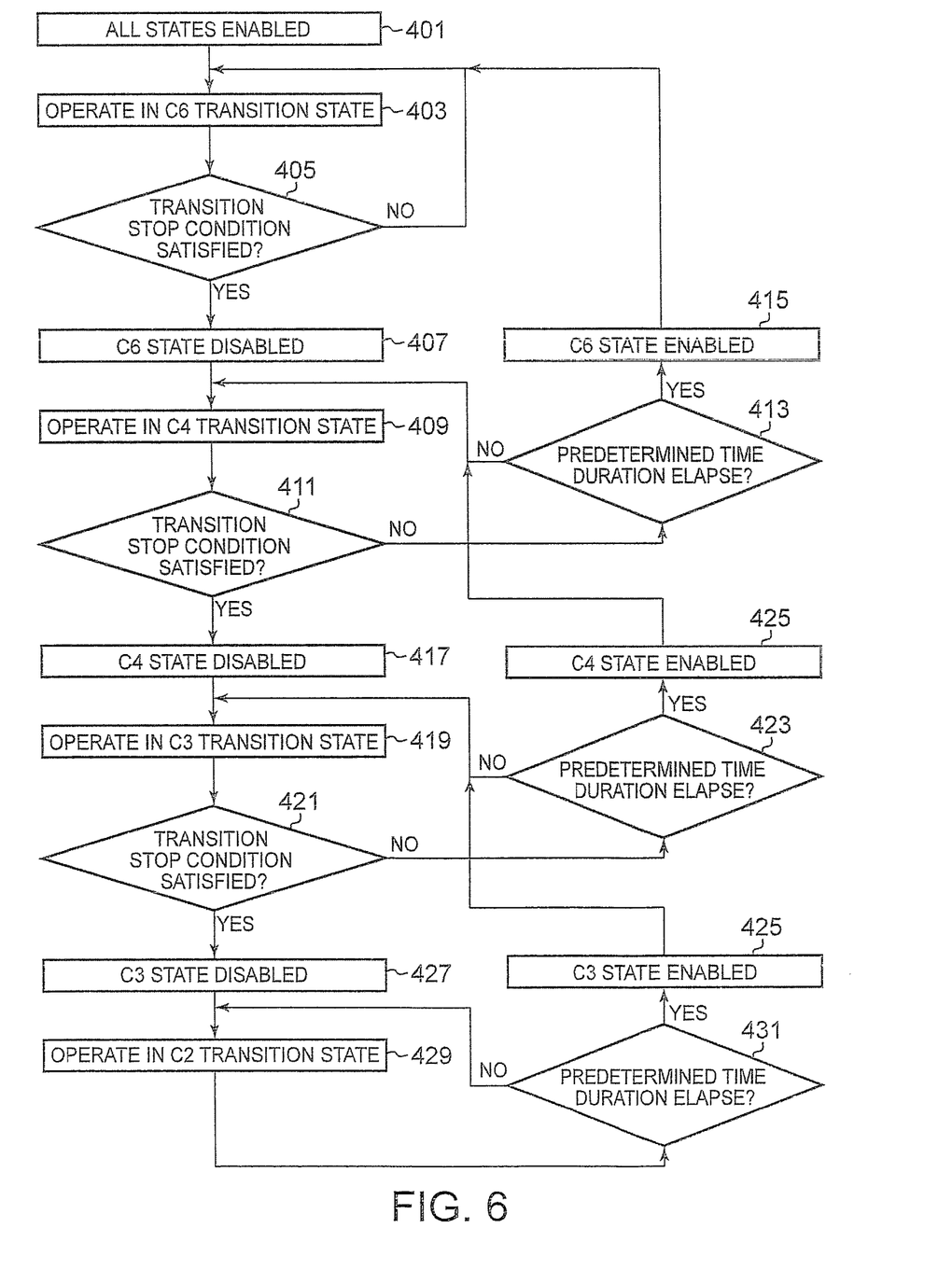
FIG. 6 is a flowchart of an alternative method for controlling power states of a processor.

FIGS. 3 and 4 illustrate the example where C0 state is maintained when the operation in Cn transition state is stopped by disabling the transition to Cn state. In the present invention, when the transition stop condition is satisfied in the current Cn transition state, the processor may operate in a transition state with a power state shallower than the current power state by one step. FIG. 6 is a flowchart illustrating an alternative method for controlling power states of the processor 10. At block 401, all sleeping states supported by the processor 10 are set in the BIOS 19, and the OS 15 makes the processor 10 transition to a deeper sleeping state one by one in accordance with the load status of the processor 10.

At block 403, the processor 10 operates in C6 transition state. At block 405, the arithmetic circuit 111 calculates a transition stop condition. As long as the transition stop condition is not satisfied, the processor operates in C6 transition state. The OS 15 may change the operating voltage and the operating frequency as one set for the processor 10 operating in C0 state based on a predetermined algorithm in accordance with the load status. This control method can eliminate the necessity to provide the timer 113 and the AND gate 115, and when the transition stop condition is satisfied, a transition stop signal output from the arithmetic circuit 111 is sent to the EC 21 as a DE signal.

At block 405, when the transition stop condition is satisfied, at block 407 the EC 21 sets C6 state in the BIOS as disabled. As a result, the OS 15 determines that the deepest sleeping state is C4 state, and at block 409 the OS 15 makes the processor 10 operate in C4 transition state in accordance with the load status, where the processor 10 transitions between C4 state and C0 state. At block 411, the arithmetic circuit 111 calculates a transition stop condition for C4 transition state. When the transition stop condition is not satisfied, the process proceeds to block 413. As for the transition stop condition in Expression (1), charging loss changes with the square of the output voltage Vn in Cn state and the power consumption of the processor 10 changes with the product of the output voltage Vn and the output current In.

Thus, when the transition frequency does not change, the transition stop condition may not be satisfied in C4 transition state even when the transition stop condition is satisfied in C6 transition state. In such a case, the total of the charging loss and the power consumption of the processor 10 becomes less when the processor 10 operates in C4 transition state than when the processor 10 maintains C0 state for operation. At block 413, when the timer of the EC 21 shows that the operating time exceeds predetermined time duration after C6 state becomes disabled or transition is performed to C4 transition state, the procedure proceeds to block 415. At block 415, it may be considered that the current system status satisfies the transition stop condition in C6 transition state that enables further reduction of the power consumption because both of or any one of the transition frequency and the power consumption of the processor in C0 state is changed. Therefore, the EC 21 sets C6 state in the BIOS 19 as enabled.

When C6 state in the BIOS 19 is set as enabled, the procedure proceeds to block 403, where the processor 10 operates in C6 transition state in accordance with the load status. Then, at block 405, when the transition stop condition is not satisfied, the processor 10 continuously operates in C6 transition state. When the predetermined time does not elapse at block 413, the procedure returns to block 409 where the processor 10 continuously operates in C4 transition state. When the transition stop condition is satisfied at block 411, at block 417 the EC 21 sets C4 state that is set as an effective sleeping state in the BIOS 19 as disabled. As a result, the OS 15 determines that the deepest power state is C3 state, and at block 419 the OS 15 makes the processor 10 operate in C3 transition state in accordance with the load status. At block 421, the arithmetic circuit 111 calculates a transition stop condition for C3 transition state.

When the transition stop condition is satisfied at block 421, at block 427 the EC 21 sets C3 state that is set as an effective sleeping state in the BIOS 19 as disabled, and then the procedure proceeds to block 429. At block 429 when the transition stop condition is not satisfied, the procedure proceeds to block 423. At block 423, when the operating time exceeds predetermined time duration after C4 state becomes disabled or transition is performed to C3 transition state, the procedure proceeds to block 425. At block 425, the EC 21 returns C4 state in the BIOS 19 as enabled, and the procedure proceeds to block 409. At block 429, the processor 10 operates in C2 transition state in accordance with the load status. At block 431, when the operating time exceeds predetermined time duration after C3 state becomes disabled or transition is performed to C2 transition state, the procedure proceeds to block 425. At block 425, the EC 21 returns C3 state in the BIOS 19 as enabled, and the procedure proceeds to block 419. At block 431, the processor 10 operates in C2 transition state until predetermined time duration elapses after C3 state becomes disabled.

As has been described, the present invention provides a method for controlling voltages supplied to a processor transitioning between an active state and a sleeping state in order to reduce power consumption.

Those skilled in the art will appreciate that the mechanisms of the present invention are capable of being distributed as a computer program product in a variety of computer-readable storage medium such as compact discs and digital versatile discs.

While the invention has been particularly shown and described with reference to a preferred embodiment, it will be understood by those skilled in the art that various changes in form and detail may be made therein without departing from the spirit and scope of the invention.

What is claimed is:

1. A DC/DC converter comprising:
an inductor;
a smoothing capacitor coupled to said inductor;
a controller for controlling an output voltage according to each power state of a processor operating in a transition state where a power state of said processor transitions between an active state and a predetermined sleeping state at a predetermined transition frequency; and
an arithmetic circuit for determining a transition stop condition based on power consumption of said processor and charging loss generated at said smoothing capacitor during transition of said active state, and for outputting a transition stop signal to stop said processor from transitioning to said predetermined sleeping state if said transition stop condition is satisfied;

wherein said transition stop condition is satisfied when a difference between power consumption of said processor maintaining a C0 state and power consumption of said processor operating in a transition state is smaller than said charging loss.

2. The DC/DC converter of claim 1, wherein said arithmetic circuit determines said charging loss based on an output voltage corresponding to said active state, an output voltage corresponding to said predetermined sleeping state and a capacitance of said smoothing capacitor.

3. The DC/DC converter of claim 1, wherein said arithmetic circuit compares a total power consumption of said processor and electric power loss of said power supply unit when said processor operates in said transition state with a total of power consumption of said processor and electric power loss of said power supply unit when said processor operates while maintaining said active state to determine said transition stop condition.

4. The DC/DC converter of claim 1, wherein said arithmetic circuit determines said transition stop condition based on actually measured power consumption of said processor, and an output voltage and said transition frequency obtained from said processor.

5. The DC/DC converter of claim 1, wherein said DC/DC converter further includes a timer circuit for stopping output of said transition stop signal and for making said processor operating while maintaining said active state operate in said transition state every predetermined time duration in order to allow said arithmetic circuit to determine said transition stop condition.

6. The DC/DC converter of claim 1, wherein said arithmetic circuit obtains said capacitance of said smoothing capacitor from a resistor element having a resistance value corresponding to said capacitance of said smoothing capacitor.

7. The of claim 1, wherein said predetermined sleeping state is a C6 state according to the Advanced Configuration and Power Interface (ACPI), during which a cache memory of said processor is powered off and an operating state of said processor is saved in a static memory.

8. A computer comprising:
a processor capable of operating in a transition state where a power state of said processor transitions between an active state and a predetermined sleeping state at a predetermined transition frequency;
a power supply unit;
a DC/DC converter, coupled to said power supply, having an inductor;
a smoothing capacitor coupled to said inductor;
a controller for controlling an output voltage according to each power state of said processor; and an arithmetic circuit for determining a transition stop condition based on power consumption of said processor and charging loss generated at said smoothing capacitor during transition of said active state, and for outputting a transition stop signal to stop said processor from transitioning to said predetermined sleeping state if said transition stop condition is satisfied; and
a transition stop circuit, in response to said transition stop signal, for stopping an operation of said processor in said transition state;
wherein said transition stop condition is satisfied when a difference between power consumption of said processor maintaining a C0 state and power consumption of said processor operating in a transition state is smaller than said charging loss.

9. The computer of claim 8, wherein said arithmetic circuit obtains said capacitance of said smoothing capacitor from a resistor element having a resistance value corresponding to said capacitance of said smoothing capacitor.

10. A computer comprising:
a processor capable of operating in a transition state during which a power state of said processor transitions between an active state and a predetermined sleeping state at a predetermined transition frequency;
a power supply unit and a DC/DC converter having an inductor;
a smoothing capacitor coupled to said inductor; and
a controller for controlling an output voltage in accordance with each power state of said processor operating in said transition state;
an arithmetic circuit for determining a transition stop condition based on power consumption of said processor and charging loss generated at said smoothing capacitor operating in said transition state and outputs a transition stop signal to stop transition to said predetermined sleeping state if said transition stop condition is satisfied; and
a device that changes, in response to said transition stop signal, setting of said processor so that said processor operates in a transition state where said processor transitions between said active state and a sleeping state shallower than said predetermined power state by one step;
wherein said transition stop condition is satisfied when a difference between power consumption of said processor maintaining a C0 state and power consumption of said processor operating in a transition state is smaller than said charging loss.

11. The computer of claim 10, wherein said arithmetic circuit obtains said capacitance of said smoothing capacitor from a resistor element having a resistance value corresponding to said capacitance of said smoothing capacitor.

* * * * *